2,876,027
LOCKING SWIVEL TYPE CLAMP ASSEMBLY

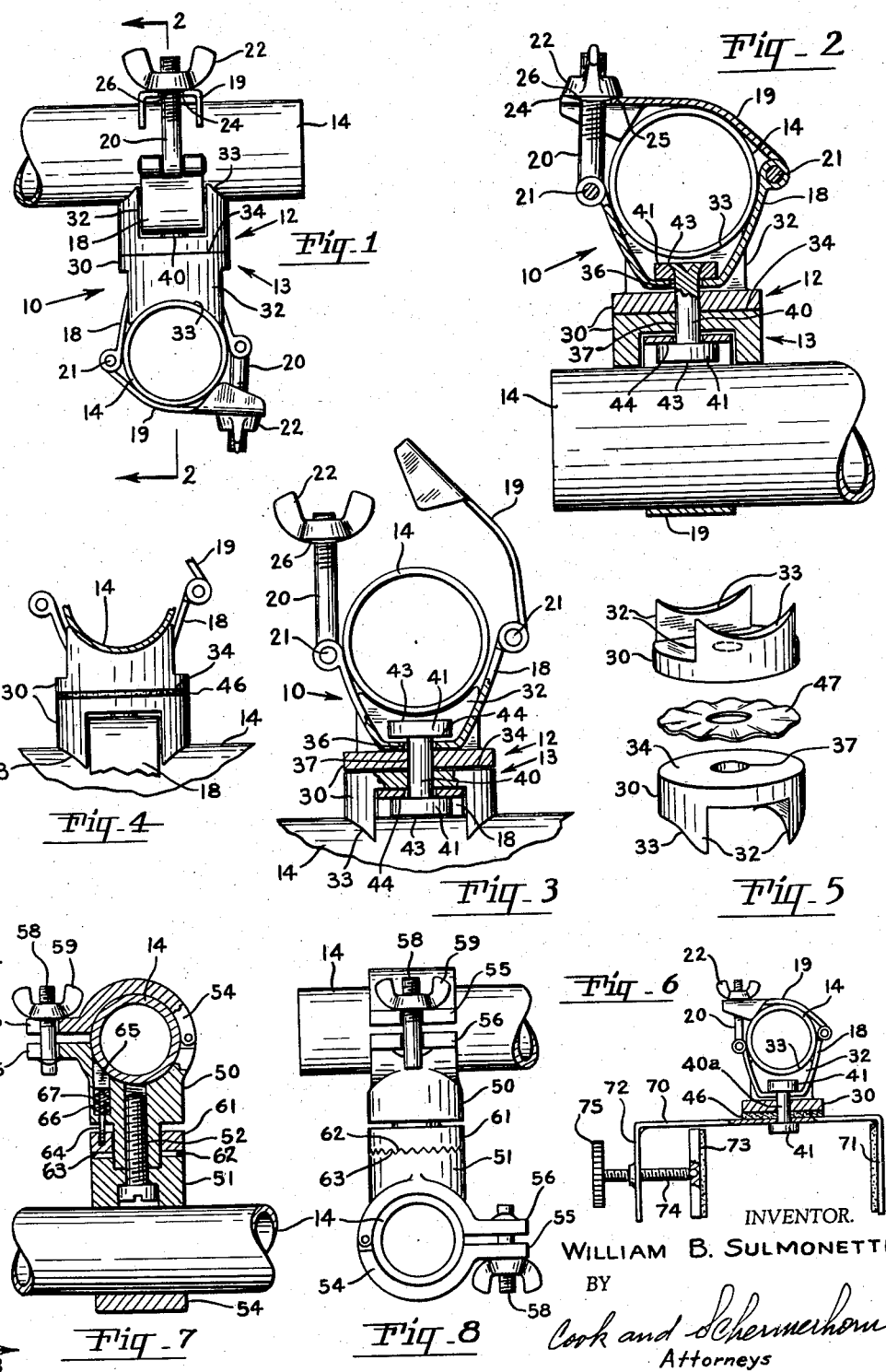

William B. Sulmonetti, Fresno, Calif.

Application February 26, 1957, Serial No. 642,569

13 Claims. (Cl. 287—54)

This invention relates to swivel clamp assemblies, particularly applicable in connecting pipes or bars in adjustable angular relation in the erection of surgical traction frames, although it is to be understood that said assemblies may be utilized with other equipment requiring a locking swivel connection between elongated bar members or the like.

This application is a continuation-in-part of my prior copending application on Surgical Traction Apparatus for Hospital Beds, Serial No. 406,719, filed January 28, 1954.

Swivel clamps heretofore known and used for such purposes have been complicated and expensive to make and awkward to use, usually requiring separate clamping means for the swivel in addition to the clamps themselves. Previous attempts to simplify such devices have not been entirely satisfactory because of a tendency to work loose if not tightened excessively and a tendency to damage the aluminum tubing now used, when so tightened.

A primary object of the present invention is, therefore, to provide a clamp assembly of novel structure adapted to produce an improved locking swivel connection between a pair of bars or the like.

Another object is to provide a self-locking swivel clamp assembly having friction swivel locking means operable by the clamps to secure the swivel in any selected position in infinite angular adjustment.

Another object is to provide a clamp assembly of the type described having improved means for clamping aluminum tubing and the like securely without damaging the tubing.

Another object is to provide a swivel clamp having a friction surface of relatively large area arranged to lock the swivel effectively when the clamp is tightened on a bar therein, but without excessive tightening of the clamp.

A further object is to provide a clamp assembly having a pair of swivel connected clamps which are automatically locked together in non-swiveling relation when both clamps are put in clamped condition and which are released to swivel relative to each other when one or both clamps is released.

Still further objects of the invention are to provide a clamp assembly of the type described which is simple in structure and economical to manufacture, which is rugged in operation, and which can be readily manipulated from released to locked position, or vice versa.

The objects enumerated above are accomplished by an improved clamp assembly in a preferred embodiment having a pair of clamps for engaging bars or the like and an improved swivel connection between the clamps by means of which the clamps have swiveling movement relative to each other when one or both of them are released but which lock together in non-swiveling relation when both of them are closed, wherein, in this latter condition, the bars are positively held in relative selected positions. Enlarged mating frictional surfaces are provided between the clamps, and a swivel pin which is connected to the clamps is arranged to firmly close the frictional surfaces on each other when the clamps are both closed. The present clamp assembly is especially applicable for erecting surgical traction framework on a hospital bed wherein weight devices can be suspended from said framework for the application of suitable traction to body members of a patient. Individual clamps of the present assembly are fast releasable for rapid adjustment of the bars or removal of the bars therefrom, and, with the clamps tightened on the bars, the frictional surfaces between the two clamps maintain the clamps fixedly together as a single unit to insure rigidity of said framework. In another form of the invention, a pair of clamps have mating toothed surfaces which are caused to be interlocked by means of a plunger mechanism engageable by a bar when said bar is clamped.

The invention will be better understood and additional objects and advantages will become apparent from the following description taken in connection with the accompanying drawings which illustrate preferred forms of the invention. It is to be understood, however, that the invention may take still other forms and that all such modifications and variations within the scope of the appended claims which will occur to persons skilled in the art are included in the invention.

In the drawings:

Figure 1 is an elevational view of a preferred form of the present clamp assembly with its clamps closed for fixedly holding a pair of bars in selected angular relationship;

Figure 2 is a sectional view, slightly enlarged, taken on the line 2—2 of Figure 1;

Figure 3 is an elevational view with a part thereof in section showing a clamp in released position;

Figure 4 is a fragmentary elevational view of a slightly modified form of structure which utilizes a flat friction washer between the two clamps;

Figure 5 is an exploded view of another modification which utilizes a spring washer between the two clamps for establishing a positive friction lock between the two clamps;

Figure 6 is a sectional view showing one of the clamp units of Figure 4 applied to a bed clamp;

Figure 7 is a sectional view through a modified form of clamp assembly; and

Figure 8 is an elevational view of this latter clamp assembly, taken on the line 7—7 of Figure 6.

A preferred form of the clamp assembly is shown in Figures 1, 2 and 3 and is designated generally by the numeral 10. Essentially, the device comprises a pair of clamps 12 and 13 which have identical structure and are designed to receive cylindrical bars or pipes 14 of the type which may be employed, for example, in surgical traction equipment. The clamp assembly may also be used in connection with scaffolds and other equipment in which elongated bars, or the like, are clamped together in different angular positions.

Each of the clamps 12 and 13 has a pair of clamp members 18 and 19. Members 18 are substantially U-shaped in side view, Figures 2 and 3, with one of their arms pivotally connected to the members 19 and the other of their arms pivotally connected to clamping bolts 20 having wing nuts 22 threadedly mounted on their free ends. The extremities of these arms are equipped with hinge pins 21 for member 19 and bolt 20. The members 19 each have an end slot 24, Figure 2, for receiving the bolts 20. The upper surface of each member 19 at the slot is countersunk or recessed at 25 for receiving a bottom correspondingly shaped projection 26 on the wing nut. By such structure, when the wing nut 22 is tightened down on the member 19, the projection 26 on the wing nut seats in the countersunk portion 25 so that the nut will not tend to slide off the end of member 19.

Also forming a part of each of the clamps 12 and 13 is a saddle member 30 having spaced arms 32 with arcuate end surfaces 33, best shown in Figure 5, which form seats for bars 14 to be clamped in the device. The arms 32 form a channel therebetween to receive the U-shaped clamp member 18.

Saddle members 30 have flat end surfaces 34 which, in assembled relation, are disposed in face to face relation. Each clamp member 18 has a central bore 36 and each saddle member 30 likewise has a central bore 37, the bores 36 and 37 being axially aligned for receiving a swivel pin 40 having enlarged heads 41 at each end. These heads have flat end surfaces 43 and flat under surfaces 44 and maintain in assembled relation the saddle members 30 and the clamp members 18. To facilitate assembly, one of the heads 41 may comprise a thick abutment washer having a conical bore against which a hollow end of the pin 40 may be outwardly expanded or riveted, as shown in Figure 2.

The distance between the under surfaces 44 of the two heads 41 slightly exceeds the combined thickness of the two clamp members 18 and the two saddle members 30 whereby these members are loosely disposed on the pin 40 between the heads 41. Also, the distance between the low points of the saddle surfaces 33, when the end surfaces 34 are abutting, slightly exceeds the distance between end surfaces 43 of the pin.

In clamping a pair of bars 14 together, a first one of the bars is inserted in one of the clamps, the wing nut 22 for the clamp being first loosened so that the clamp bolt 20 can be pivoted away from the member 19 and the bar moved downwardly into the member 18. The bar seats on the surfaces 33 of the saddle members 30, and, when this bar is properly located in the clamp, the clamp bolt 20 is brought into engagement with the member 19 and the wing nut tightened. The tightening action of the wing nut draws the member 19 firmly into engagement with the bar, and, in the initial part of the tightening operation, the bar engages the seats 33 of the saddles 30. However, upon firm tightening of the nut 22, the member 18 is drawn toward the bar and such movement of this member causes it to engage the under surface 44 of the adjacent head 41 to draw this head into engagement with the bar 14. This engaging movement of the pin head releases any pressure of the bar against the seats 33, and, in such position, the member 19 and head 41 serve as the jaw members in gripping the bar.

When the head of pin 40 engages the bar 14, as described above, its movement is halted and the head 41 at the opposite end does not apply a compressive force to the clamp parts disposed intermediate the two heads, whereby the clamp which has not been tightened is free to swivel relative to the tightened clamp. In such condition both saddle members 30 are loose on pin 40. This is illustrated in Figure 3 where the lower clamp is tightened, causing lower bar 14 to bear against lower head 41 and the upper clamp is loose. Upper head 41 is spaced a short distance below upper bar 14. The parts are proportioned such that lower head 41 engages its bar 14 before upper head 41 is brought to bear on member 18, and such that upper head 41 is spaced below the upper bar 14.

Upon mounting a bar in the second clamp and tightening the wing nut 22 on said clamp, a force on the member 18 of this latter clamp is similarly applied now to the surface of the other head of the pin 40 and this pin is thereby urged in the opposite direction from that explained in connection with the first clamp. The pull thereby exerted by pin 40 on the member 18 of said first clamp is transmitted to its member 19 and the first mentioned bar is thus pulled down firmly into engagement with the arcuate surfaces 33 of its saddle member 30. Since the over-all length of pin 40 is less than the distance between the centers of the opposite arcuate saddle surfaces, tightening of the last wing nut causes both the bars 14 to be seated firmly on the saddles 30. When the nuts are tightened equally, the pin 40, which is held in tension between the clamp members 18, will center itself between the two bars without touching either one of them and an equal binding force will be distributed to said bars. This condition is illustrated in Figure 2 where pin 40 is under tension and saddle members 30 are under compression.

If the second clamp is tightened more than the first clamp, the first clamp will thereupon be further tightened by reaction forces exerted through pin 40 and saddle members 30. In loosening one of the wing nuts, the slight longitudinal movement of the pin 40 which may result therefrom is not sufficient to loosen the other clamp beyond its original adjustment whereby adjustment of the bar in one clamp can be made and the other clamp will not be appreciably loosened.

When both clamps are tightened, as shown in Figure 2, the surfaces 34 of the two saddle members 30 are held firmly together in frictional engagement over a relatively large area so that relative swiveling action of these two saddle members on the pin is effectively prevented without excessive tightening of the clamps. Thus, the bars are secured without damage by engagement with the contoured surfaces of members 19 and saddles 30 and the relatively small areas of heads 41 are not utilized as friction members to lock the swivel movement.

When either clamp is loosened, the swivel lock is released. Partially loosening either one of the clamps will relax some of the restraint on the swivel action so that the angular relationship of the bars may be adjusted without releasing them from the clamps. Figures 4 and 5 show modified forms of construction to increase the resistance to swiveling action. In Figure 4, a friction washer 46, which may be plastic or a special composition material, is disposed between the two saddle members to resist relative turning movement of these members in clamped position.

In Figure 5 a corrugated spring washer 47 of metallic construction is disposed between the two saddle members to take up the slack and interpose some frictional restraint to prevent free turning of the parts when the clamps are loosened. The same result may be accomplished in Figure 4 by making the flat washer 46 of resilient compressible material held under compression.

Figure 6 shows a single one of the clamp units, hereinabove described, swivelly connected with a rigid supporting plate, such as the web plate 70 of a bed clamp. The bed clamp comprises a rigid channel member having spaced flanges 71 and 72 on opposite ends of the web plate 70. The inside surface of flange 71 is padded to engage one side of a bed rail or other suitable support when the opposite side of the bed rail is engaged by an adjustable padded clamping plate 73. A screw 74 threadedly mounted in the flange 72 has a ball end or other suitable rotative connection with the plate 73. The other end of screw 74 is equipped with a hand wheel 75 for tightening.

In Figure 6, the clamp parts associated with bar 14 are the same as previously described except that in this case pin 40a is not long enough to permit the upper head 41 to touch the bar 14. Before wing nut 22 is tightened, the clamp members 18, 19 are free to swivel on pin 40a, subject to a light frictional restraint imposed by friction washer 46. After wing nut 22 is tightened on bar 14, the bar exerts a downward thrust against the seats 33 of saddle member 30, pressing the friction washer 46 against plate 70. The reaction for this thrust appears as tension in pin 40a, whereby the lower head 41 is drawn upwardly against the underside of plate 70. The swivel movement between the pipe clamp and the bed clamp is thereby locked when the pipe clamp is tightened by means of wing nut 22.

Figures 7 and 8 show a modified form of clamp structure comprising a pair of clamp body members 50 and 51 pivotally interconnected by a bolt 52. The body member 50 has an upper hinged clamping element or jaw 54 terminating in a projecting lug 55 associated with a stationary lug 56 on the body member 50 for receiving in clamped relation a clamp bolt 58 having a wing nut 59 threaded thereon. As seen in Figure 8, the clamp body member 51, similar to the member 50, has a hinged clamping element or jaw 54 with a lug 55 associated with a stationary lug 56 on the member 51 and a clamp bolt 58 for establishing clamping relation on a bar 14.

Disposed between the body members 50 and 51 is a ring 61 having downwardly projecting teeth or serrations 62. Body member 51 has teeth or serrations 63 on its upper surface adapted to mesh with teeth 62. Threadedly secured to the ring 61 is a pin 64 connected to a plunger 65 which operates in a bore 66 and which is spring pressed in an upward direction by a spring 67. The bore 66 projects into the lower seat portion of the body member 50, and, when a bar 14 is firmly clamped in the device, the plunger 65 is forced downwardly to cause the teeth 62 on the ring 61 to move into meshing engagement with the teeth 63 on the body member 51. When the upper hinged clamping member 54 is released and the bar 14 removed, the plunger 65 moves upwardly from the force of spring 67 and the ring 61 is raised out of locking engagement with the teeth 63 on the lower clamp body member 51 whereupon the two clamp body members 50 and 51 may swivel relative to each other on the bolt 52.

It will be apparent to persons skilled in the art that the principles of the invention may be applied to different forms of clamps and supports and are not limited to the particular form of pipe or bar clamp which is illustrated by way of example.

Having now described my invention and in what manner the same may be used, what I claim as new and desire to protect by Letters Patent is:

1. A swivel clamp comprising a support, a hinged jaw pipe clamp, a swivel pin connecting said clamp with said support for relative swivel movement, and a pipe engaging element on said swivel pin arranged to lock said swivel movement when said clamp is tightened on a pipe.

2. An adjustable angle multiple clamp for rigidly connecting together a pair of pipes and the like comprising a pair of identical hinged jaw pipe clamps, a swivel connection between said clamps providing free swivel movement between said clamps when either one of said clamps is tightened on a pipe and the other clamp is not tightened on a pipe, and means in both of said clamps engageable by pipes therein constructed and arranged to lock said swivel connection only when both clamps are tightened on pipes.

3. An adjustable angle multiple clamp for rigidly connecting together a pair of pipes and the like comprising a pair of swivel connected pipe clamps, and members in both of said clamps having portions in said clamps engageable by pipes therein and portions disposed in confronting relation arranged to be pressed into frictional engagement with each other to lock said swivel connection only when both of said clamps are tightened on pipes.

4. An adjustable angle multiple clamp for rigidly connecting together a pair of pipes and the like comprising a pair of pipe clamps, a tension pin interconnecting said clamps for swivel movement, and a pair of abutting compression members on said pin having pipe engaging portions in said clamps.

5. A device as defined in claim 4 including a friction washer interposed between said compression members.

6. An adjustable angle multiple clamp for rigidly connecting together a pair of pipes and the like comprising a pair of swivel connected pipe clamps, and identical saddle members in both of said clamps having portions abutting each other in frictional engagement between the clamps.

7. An adjustable angle clamp assembly comprising a pair of oppositely directed saddle members having end walls disposed in face to face relation, a pin interconnecting said saddle members for relative swivel movement, heads on opposite ends of said pin, clamp elements for receiving bars to be clamped in selected angular positions, certain of said clamp elements having an apertured wall portion receiving said pin, said wall portions being confined between said heads and said saddles, and releasable tightening means operating to close said clamping elements on said bars.

8. A clamp assembly as defined in claim 7 wherein said end walls of said saddles comprise friction surfaces which are pressed into engagement with each other in the closed position of said clamps to prevent relative swiveling movement between said saddles.

9. A clamp assembly as defined in claim 7 wherein said saddle members have arcuate seat portions engageable by bars clamped in said clamp elements.

10. A clamp assembly as defined in claim 8 wherein each of said saddle members has a pair of spaced arcuate seat portions engageable by bars clamped in the assembly, said clamp elements with said apertured wall portions being disposed between said arcuate seat portions.

11. A clamp assembly as defined in claim 7 wherein a friction washer is disposed between said saddles for providing a friction lock on said swivel movement in the closed position of said clamps.

12. An adjustable angle clamp assembly comprising a pair of oppositely directed saddle members having seat portions adapted to be engaged by bars held by said assembly, a pin interconnecting said saddle members and providing relative swiveling movement therefor, head portions at opposite ends of said pin, and a clamp element connected to each end of said pin intermediate a head of said pin and one of said saddles, said pin having an over-all length less than the distance between said seat portions and being held in tension between said seat portions in clamped position of the clamp elements.

13. A swivel clamp comprising a support, a hinged jaw pipe clamp, a swivel pin connecting one jaw of said clamp with said support for relative swivel movement, a saddle member for clamping said swivel movement, said saddle member having a centrally apertured flat circular base portion, said base portion being disposed between said support and said one jaw with said pin in said aperture, and a pair of arms on said base portion disposed on opposite sides of said one jaw and having arcuate end surfaces to seat against a pipe in said clamp.

References Cited in the file of this patent

UNITED STATES PATENTS

| | | |
|---|---|---|
| 1,546,332 | Walters | July 14, 1925 |
| 1,706,801 | Merrill | Mar. 26, 1929 |
| 1,783,735 | Marshall | Dec. 2, 1930 |
| 1,835,473 | Davidson | Dec. 8, 1931 |

FOREIGN PATENTS

| | | |
|---|---|---|
| 693,500 | Great Britain | July 1, 1953 |